United States Patent [19]
Johnson

[11] Patent Number: 4,566,579
[45] Date of Patent: * Jan. 28, 1986

[54] MULTIPLE BISCUIT CLUTCH OR BRAKE WITH CIRCULATED IMMERSION COOLING

[75] Inventor: Earl R. Johnson, Tulsa, Okla.

[73] Assignee: Loffland Brothers Company, Tulsa, Okla.

[*] Notice: The portion of the term of this patent subsequent to Jun. 22, 1999 has been disclaimed.

[21] Appl. No.: 614,999

[22] Filed: May 29, 1984

[51] Int. Cl.$^4$ .................. F16D 13/72; F16D 25/063
[52] U.S. Cl. ........................ 192/113 B; 192/70; 192/70.12; 192/85 AB; 188/264 D; 188/71.6
[58] Field of Search .................. 192/70, 70.12, 85 AB, 192/113 B; 188/71.3, 71.6, 264 D, 264 E

[56] References Cited

U.S. PATENT DOCUMENTS

| | | | |
|---|---|---|---|
| 3,237,738 | 3/1966 | Suppes et al. | 192/70 |
| 4,335,808 | 6/1982 | Johnson | 192/85 AB |

FOREIGN PATENT DOCUMENTS

| | | | |
|---|---|---|---|
| 27928 | 6/1907 | Sweden | 192/85 AB |
| 165780 | 5/1922 | United Kingdom | 192/113 B |
| 656370 | 8/1951 | United Kingdom | 192/113 B |
| 818889 | 10/1951 | United Kingdom | 192/85 AB |
| 982403 | 2/1965 | United Kingdom | 192/113 B |

Primary Examiner—Samuel Scott
Assistant Examiner—Allen J. Flanigan
Attorney, Agent, or Firm—Head, Johnson & Stevenson

[57] ABSTRACT

A multiple biscuit clutch or brake apparatus comprising an annular disc operably secured to a rotatable shaft and having a plurality of circumferentially spaced bores provided therein, a pair of complementary pistons slidably disposed in each bore in back-to-back relation and responsive to the application and withdrawal of pressure therebetween for reciprocation within the bore, an annular flange disposed on each side of the disc and outboard of the pistons for frictional engagement thereby upon axially outward movement of the pistons within the respective bores, the frictional engagement between the pistons and the flanges providing either a braking or clutching operation, and a housing encasing the disc and flanges to provide a chamber therearound, the housing being provided with inlet and outlet ports whereby a coolant may be introduced into the chamber and circulated around the disc and pistons and flanges for dissipating the heat generated by the frictional engagement of the pistons and flanges, the coolant being discharged from the chamber through the outlet ports for either recirculation in the system or discarded, as desired.

8 Claims, 7 Drawing Figures

MULTIPLE BISCUIT CLUTCH OR BRAKE WITH CIRCULATED IMMERSION COOLING

BACKGROUND OF THE INVENTION

1. Field of the Invention

This invention relates to improvements in brake and clutch apparatus and more particularly, but not by way of limitation, to a disc brake type apparatus which may be used for either a brake operation or a clutch operation and which is particularly provided with improved cooling means for dissipation of the generated heat.

2. Description of the Prior Art

Disc braking apparatus has been developed largely from the aircraft industry wherein the tremendous forces necessary in the braking of large fast moving aircraft are usually too great for control by the earlier drum type braking systems. As a result of the improved results with disc brake installations, this type braking equipment is widely used in industrial installations wherein great braking forces are required, such as in the control of the rotational speed of the wheels of large off-highway vehicles, the braking of cable spooling drums in many of the present day well bore drilling operations, and the like. These disc brake devices perform well, but have certain disadvantages in that a great amount of heat is generally developed during the braking operation, and the dissipation of the heat frequently becomes a problem. Examples of devices utilizing a disc brake type application are shown in the McCune U.S. Pat. No. 2,174,400, issued Sept. 26, 1939, and entitled "Brake Mechanism"; Wellman et al U.S. Pat. No. 2,381,941, issued Aug. 14, 1945, and entitled "Frictional Apparatus"; Cardwell et al U.S. Pat. No. 2,563,673, issued Aug. 7, 1951, and entitled "Fluid Pressure Operated Flexible Disk Clutch"; Burnett U.S. Pat. No. 2,938,609, issued May 31, 1960, and entitled "Automatic Adjustor for Brakes"; Hobbs U.S. Pat. No. 3,421,604, issued Jan. 14, 1969, and entitled "Disc Brake Actuating Piston Adjusting Means"; Link U.S. Pat. No. 3,750,787, issued Aug. 7, 1973, and entitled "Hydraulically Operated Friction Clutch". In addition, my own prior U.S. Pat. No. 4,335,808, issued June 22, 1982, and entitled "Multiple Biscuit Clutch or Brake" discloses a disc brake type apparatus particularly designed and constructed for operation alternatively as a brake or clutch, and which is provided with particular means for dissipating the generated heat during actuation thereof. The Dunwoodie U.S. Pat. No. 1,608,766, issued Nov. 30, 1926, and entitled "Control Mechanism for Gear Driven Superchargers" was cited during the prosecution of my prior patent, but is not considered pertinent to the present apparatus. Under some practical installations, however, the generated heat is still considerably great and creates undesirable problems, even though greatly reduced by the design of my prior patent.

SUMMARY OF THE INVENTION

The present invention contemplates a novel multiple biscuit clutch or brake apparatus generally similar to that shown in my prior patent, but particularly designed and constructed for further dissipating of the heat by the application of an immersion cooling system. The novel apparatus comprises the usual rotatable annular disc interposed between a pair of annular flanges which, in case of a braking operation, are held stationary, but in the case of a clutching operation are normally stationary but may be rotated simultaneously with the annular disc when in an engaged condition. The disc is provided with a plurality of circumferentially spaced back-to-back caliper pistons secured therein. A fluid chamber is interposed between the back-to-back pistons, and is in communication with a source of suitable pressure fluid, such as air, hydraulic fluid, or the like, for selective extension of the pistons into a gripping engagement with the inboard faces of the flanges to provide either the braking action or clutch action, and an alternate retracted position for disengagement of the pistons with respect to the flanges in order to release the braking action or clutching operation. The flanges are disposed outboard of the annular disc, thus the heat dissipation during operation of the apparatus is greatly enhanced. In addition, however, inlet means communicates a suitable coolant, such as water or other suitable hydraulic fluid for admitting the coolant into the chamber or area surrounding the pistons and outlet means is provided for discharge of the hot fluid from the area. Thus, a coolant is circulated to and from the pistons and the heat is absorbed by the fluid and the warm or hot fluid is removed from the area for reducing the heat at the piston area. The novel multiple biscuit brake or clutch apparatus is simple and efficient in operation and economical and durable in construction.

DETAILED DESCRIPTION OF THE PREFERRED EMBODIMENTS

Figure 1:
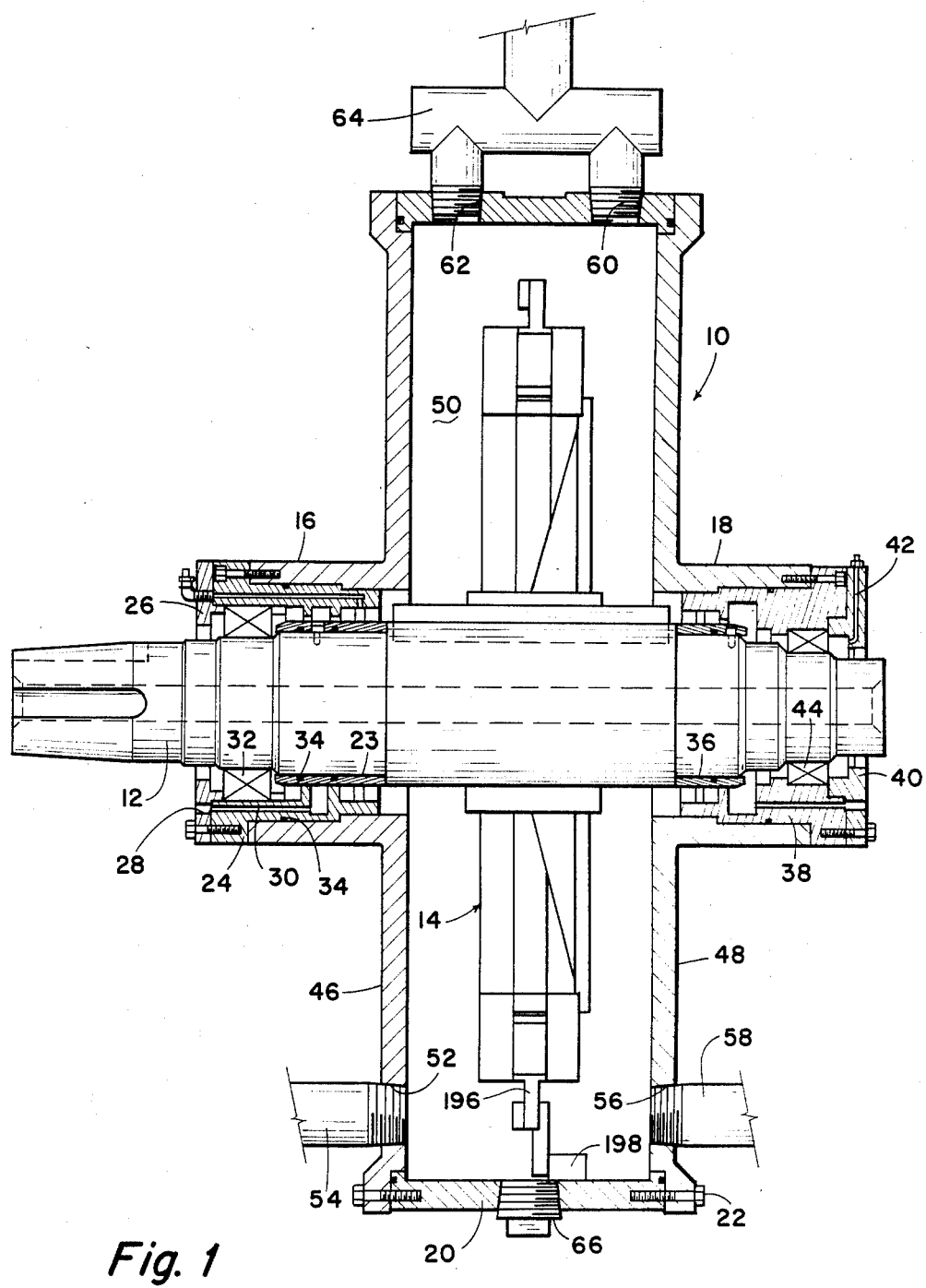
FIG. 1 is a sectional elevational view of a multiple biscuit brake or clutch apparatus embodying the invention, with portions shown in elevation for purposes of illustration.

Referring to the drawings in detail, and particularly FIGS. 1 and 2, reference character 10 generally indicates a multiple biscuit brake or clutch apparatus comprising a brake/clutch assembly 14 keyed or otherwise secured around the outer periphery thereof for a purpose and in a manner as will be hereinafter set forth. A pair of substantially identical oppositely disposed flanged hub members 16 and 18 are disposed around the outer periphery of the shaft 12 and spaced from the opposite sides of the assembly 14. A cylindrical housing or sleeve 20 is secured between the spaced flanged hubs 16 and 18 and secured in the proximity of the outer peripheries thereof in any suitable manner, such as by a plurality of bolts 22, thus providing a housing around the assembly 14. The hub members 16 and 18 may be supported on the shaft 12 in any suitable manner whereby the hubs 16 and 18 are held stationary without interference with the free rotation of the shaft 12 about its own longitudinal axis.

As shown in FIG. 1, suitable bushing means 23 is disposed around the outer periphery of the shaft 12 within the hub 16 for supporting a suitable lubricating sleeve means 24 interposed between the hub 16 and the shaft 12. A suitable annular end cover plate 26 may be secured to the outer end of the lubricating sleeve 24, and may be provided with a plurality of apertures 28 providing communication between the exterior of the sleeve 24 and the internal fluid passageways 30 whereby a lubricant may be injected between the sleeve 24 and the bushing 23 for facilitating relative rotation therebetween, as is well known. Of course, suitable bearing means 32 is interposed between the shaft 12 and the sleeve 24, and the lubricating fluid also provides lubrication for the bearing during operation of the assembly 10. In addition, suitable sealing members, such as O-rings 34 may be interposed between the hub 16 and the shaft 12 for precluding leakage of fluid therebetween.

Similarly, a suitable bushing means 36 may be disposed around the outer periphery of the shaft 12 and within the hub 18 for supporting a suitable lubrication sleeve means 38 which, in turn, supports the hub member 18. Suitable annular end cover plate means 40 may be secured to the outer end of the sleeve 38 and is preferably provided with port or passageway means 42 providing for the injection of a suitable lubricant between the sleeve 38 and the shaft 12. Of course, suitable bearing means 44 may be interposed between the shaft 12 and the sleeve 38 for facilitating the free rotation of the shaft 12 with respect to the sleeve 38 and hub 18, as is well known.

As hereinbefore set forth, the hub members 16 and 18 are flanged hub members, and are provided with outwardly extending circumferential flanges 46 and 48, respectively, secured at their outer peripheries to the opposite ends of the sleeve 20. The flanges 46 and 48 cooperate with the sleeve 20 for providing a housing encasing the brake/clutch apparatus 14 in an annular chamber 50 surrounding the outer periphery of the shaft 12. A first inlet port 52 is provided in the flange 46, and is preferably disposed in the proximity of the outer periphery thereof, as particularly shown in FIG. 1, for receiving a suitable conduit or pipe means 54 therein. The conduit means 54 is in communication with a reservoir 55 of suitable fluid, such as water or other hydraulic fluid (not shown) whereby a quantity of the fluid may be delivered into the chamber 50. In addition, a second inlet port 56 may be provided in the flange 48 for receiving a suitable conduit or pipe means 58 therein. The inlet port 56 is preferably disposed in substantial axial alignment with the inlet port 52, but not limited thereto, and the pipe or conduit means 58 is in communication with the reservoir 55 for directing a quantity of the fluid into the chamber 50.

A pair of spaced outlet ports 60 and 62 may be provided in the sleeve 20 and are preferably disposed substantially diametrically with respect to the inlet ports 52 and 56. The ports 60 and 62 may be suitably connected with a manifold 64, or the like, which is in communication with the reservoir 55 as is particularly shown in FIG. 2. The fluid entering the chamber 50 through the inlet ports 52 and 56 is circulated through the chamber 50 and discharged therefrom through the outlet ports 60 and 62 and returned to the reservoir for subsequent reuse as will be hereinafter set forth. Of course, it is also preferable to provide a suitable drain port means 66 in the sleeve 20 and preferably disposed in the lower portion thereof whereby fluid may be drained from the chamber 50 by gravity when necessary or desired, as is well known.

Figure 2:
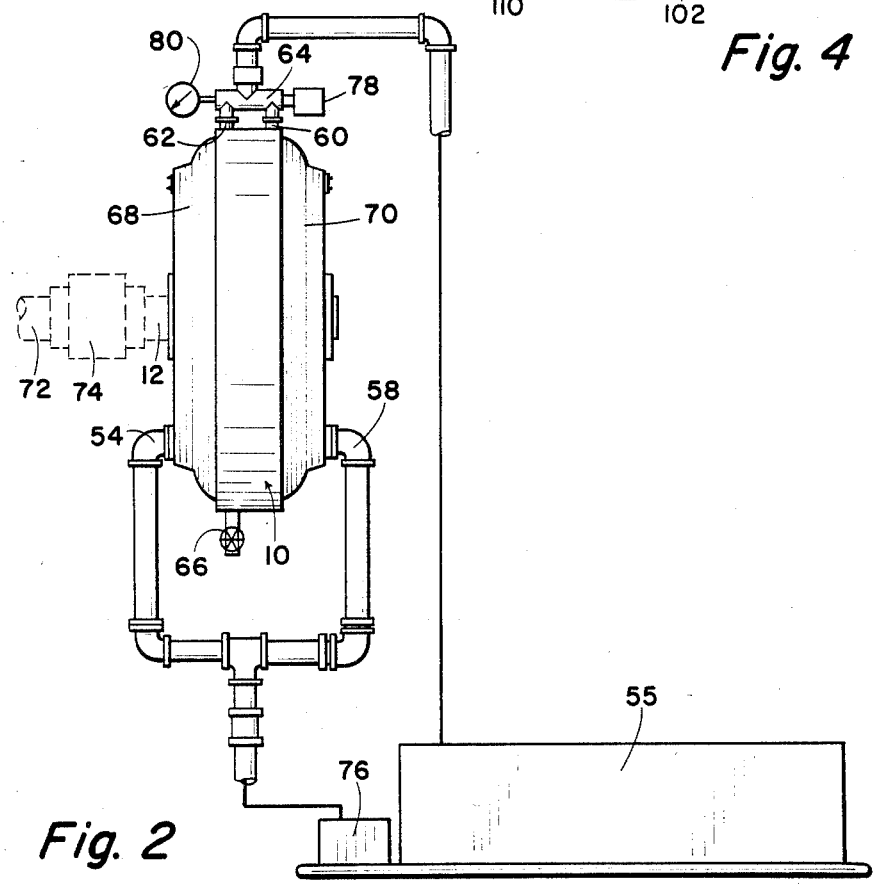
FIG. 2 is a side elevational view of a drawworks braking system having a multiple biscuit brake apparatus embodying the invention installed therein.

Referring particularly to FIG. 2, the assembly or apparatus 10 may typically be installed for use as a positive braking system in a drawworks such as frequently utilized in a well bore drilling operation, and if desired, a pair of oppositely disposed end cover members 68 and 70 may be suitably secured to the flanges 46 and 48, respectively, for encasing thereof. The rotatable shaft 12 may be operably connected with the usual shaft 72 of a drawworks drum (not shown) through the usual or standard spline disconnect assembly 74, as is well known, whereby rotation of the drum shaft 72 will be transmitted to the shaft 12. The brake/clutch apparatus or assembly 14 will function in the manner as will be hereinafter set forth to perform a positive braking action for the drum, and the fluid in the chamber 50 will function for dissipation of the heat generated during the braking operation.

A suitable pumping means 76 may be operably connected between the reservoir 55 and the inlet ports 54 and 58 for delivery of the fluid from the reservoir into the chamber 50. The reservoir 55 may be in the form of a sink tank, as is well known, and it is preferable to provide suitable thermostatic switch means 78 in communication with the interior of the manifold 64, the switch means 78 normally being activated only during operation of the pumping means 76. In addition, a pressure gage-level cock means 80 may be installed in communication with the interior of the manifold 64 to provide a visual indication of the condition of the fluid in the chamber 50. The system shown in FIG. 2 is a closed system, and preferably utilizes radiator quality water as the fluid in the system.

Figure 4:
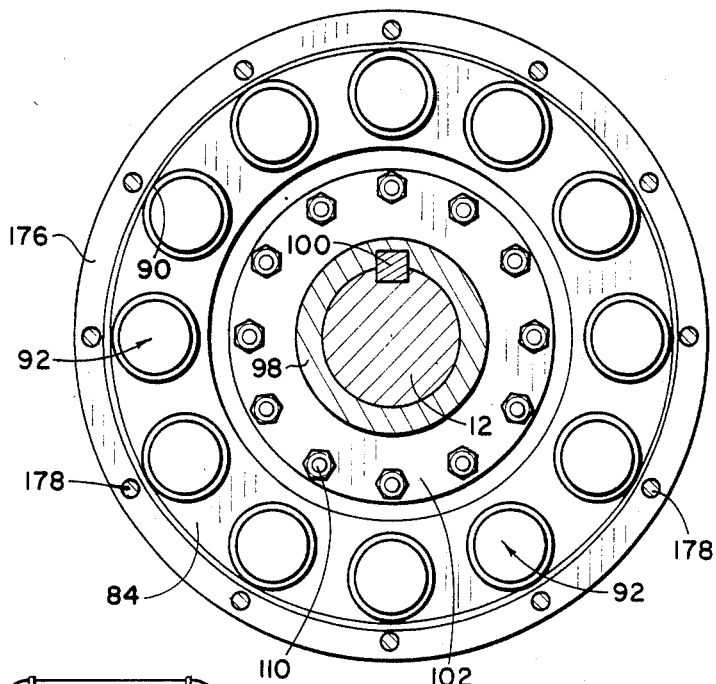
FIG. 4 is a view taken on line 4—4 of FIG. 3 and is shown in a reduced size for illustrating both halves of the apparatus.
Figure 3:
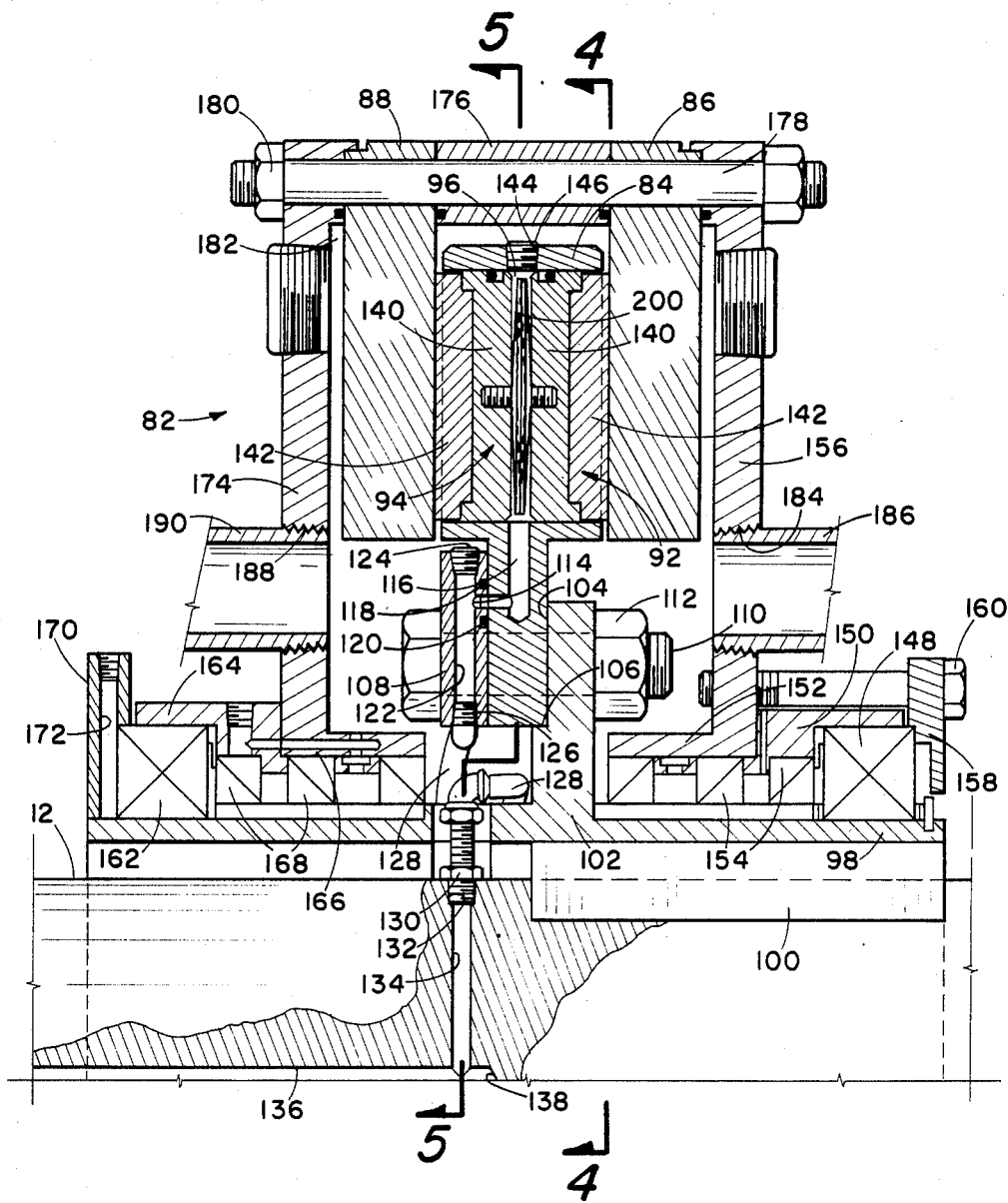
FIG. 3 is an enlarged sectional elevational view of a half section of a multiple biscuit brake or clutch apparatus embodying the invention and taken on line 3—3 of FIG. 5.
Figure 5:
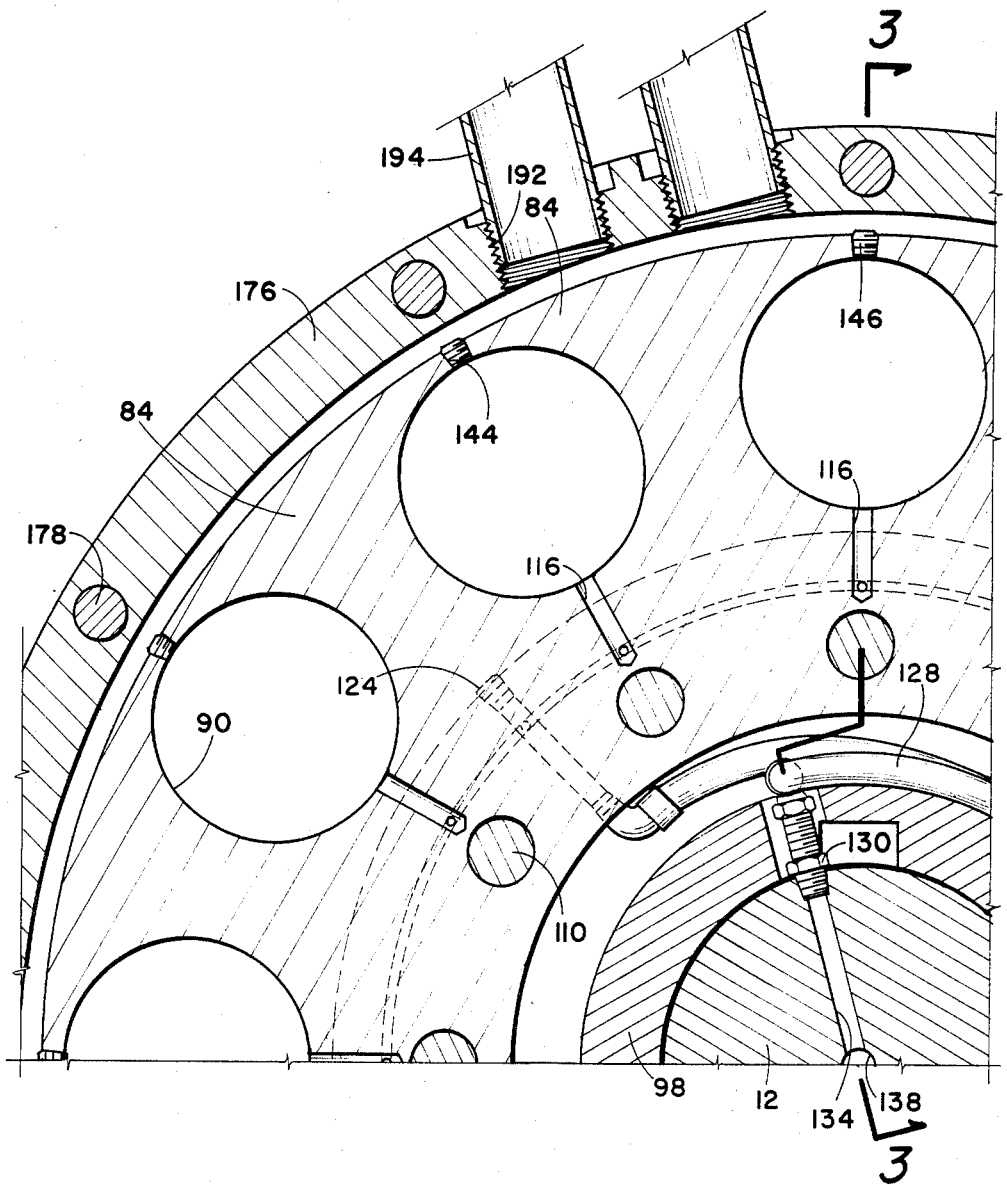
FIG. 5 is a view taken on line 5—5 of FIG. 3.

Referring now to FIGS. 3, 4 and 5, reference character 82 generally indicates a brake/clutch apparatus which may be utilized as the brake/clutch apparatus 14 shown in FIGS. 1 and 2. The brake/clutch apparatus 82 comprises an annular disc member 84 interposed between a pair of substantially identical annular flanges 86 and 88. The disc 84 is secured to the shaft 12 in a manner as will be hereinafter set forth for rotation simultaneously therewith. The flanges 86 and 88 are supported by the shaft 12 in a manner as will be hereinafter set forth whereby the flanges 86 and 88 are normally stationary with respect to the disc 84. A plurality of bores or apertures 90 are circumferentially spaced around the disc 84 and a pair of oppositely disposed or back-to-back substantially identical pistons 92 and 94 are slidably secured within each bore 90 for a purpose as will be hereinafter set forth. A hiatus or chamber 96 is interposed between each pair of oppositely disposed pistons 92 and 94 and is in communication with a source of fluid, such as air, hydraulic fluid, or the like, in a manner as will be hereinafter set forth. The application of fluid pressure in the chamber 96 creates a force against the inboard faces of each piston 92 and 94 for extending the pistons axially outwardly within the respective bore or aperture 90 whereby the outboard faces of the pistons will engage the respective flanges 86 and 88. Conversely, withdrawal of the pressure fluid from the chamber 96 creates a vacuum within the chamber 96 whereby the pistons retract within the respective bore 90, thus disengaging the outboard faces of the pistons from the flanges 86 and 88.

The shaft 12 may be the rotatable operating shaft for substantially any desired equipment with which the apparatus 82 is to be utilized, and is rotated about its own longitudinal axis in any suitable or well known manner, as for example by the drum shaft 72 in the drawworks installation shown in FIG. 2. A hub member 98 may be concentrically disposed around the outer periphery of the shaft 12 and is secured thereto in any suitable manner, such as by key means 100, whereby the hub 98 rotates simultaneously with the shaft 12. A circumferential flange 102 extends radially outwardly from the outer periphery of the hub 98 and is provided with a recess portion 104 on the inner face thereof forming an annular shoulder 106 around the inboard or inner face thereof. The inner periphery of the disc member 84 rests on the shoulder 106, and one face of the disc 84 bears against the recess 104 of the flange 102. An annular plate or ring 108 is disposed against the opposite face of the disc 84 and may be secured thereto by a plurality of circumferentially spaced bolts 110 and complementary nuts 112. The bolts 110 extend through the ring 108, disc 84 and flange 102, thus securing the disc 84 to the hub 30 whereby the disc 84 may be rotated simultaneously with the shaft 12.

The inner diameter of the ring 108 is preferably substantially equal to the inner diameter of the disc 84, but not limited thereto, and the outer diameter of the ring 108 is preferably slightly less in dimension than the diametric dimension defined by the innermost circumferential portion of the bore 90 or pistons 92 and 94, as will be particularly seen in FIG. 3. An annular recess 114 is provided on the inboard face of the ring 106 immediately adjacent the disc 84, and a plurality of substantially L-shaped passageways 116 are provided in the body of the disc 84. A passageway 116 is provided for each of the bores 90 of the disc 84, and each passageway 116 has one end open to the annular recess 114 and the opposite end open to the chamber or hiatus 96 of the respective bore 90. In this manner each passageway 116 provides communication between the recess 114 and the respective chamber 96 for directing a pressure fluid to and from the chambers 96 for a purpose as will be hereinafter set forth. Of course, it is preferable to provide suitable sealing members on the opposite sides of the recess 114, such as O-rings 118 and 120, for precluding leakage of fluid.

An inlet passageway means 122 is provided in the ring 108 and extends into communication with the annular recess 114 for directing the pressure fluid thereto. The passageway may be open at the opposite ends thereof, and one end may be internally threaded for receiving a suitable plug means 124 therein, and the opposite end may be threaded for receiving a suitable fitting 126 therein. The fitting 26 is suitably secured to one end of a tube or conduit member 128 having a generally similar fitting 130 provided at the opposite end thereof for threaded connection with an outlet port 132 provided in the shaft 12. The outlet port 132 is in communication with a radially extending bore 134 which terminates at a centrally disposed longitudinally extending passageway 136 provided in the shaft 12. The passageway 136 is preferably closed at one end 138 and the opposite end thereof (not shown) is in communication with a source of pressure fluid, such as air, hydraulic fluid, or the like (not shown).

As hereinbefore set forth, each bore 90 contains two substantially identical, oppositely disposed pistons 92 and 94 therein. The pistons 92 and 94 may be of any suitable or well known type, such as commonly used in connection with the brake calipers in a disc braking system, and as shown herein each piston comprises a substantially cylindrical main body portion 140 which may be provided with suitable sealing means (not shown) between the outer periphery thereof and the inner periphery of the respective bore 90 for precluding leakage of fluid therebetween. A substantially circular friction member 142 is secured to the outboard face of each body 140 in any suitable manner (not shown) for a purpose as will be hereinafter set forth. In addition, a radially extending port 144 may be provided in the disc 84 open to each of the bores 90 and preferably oppositely disposed from the respective passageway 116, but not limited thereto. A suitable plug member 146 may be threadedly secured to the access port 144 for closing thereof, as is well known.

A suitable bearing 148 is disposed around the outer periphery of the hub 98 for supporting a sleeve member 150 in concentric spaced relation with respect to the shaft 12. A hub member 152 is also concentrically arranged in spaced relation about the outer periphery of the shaft 12 and disposed inboard of the sleeve 150. A plurality of spaced suitable dynamic members 154 are interposed between the hub 152 and the shaft 12 and between the sleeve 150 and the shaft 12 for precluding leakage of fluid therebetween and facilitating the independent rotation of the shaft 12 with respect to the sleeve 150 and hub 152. The hub 152 is provided with an outwardly extending circumferential flange 156 at one end thereof disposed against the inner end of the sleeve 150. An annular ring member 158 is disposed against the outer end of the sleeve 150 and is in engagement with the outer face of the bearing means 148 for retaining the bearing means 148 in position on the shaft 12. The ring 158 is secured to the flange 156 in any suitable manner, such as by a plurality of bolts 160 which span the length of the sleeve 150 and thus the sleeve 150 and bearing 148 are retained against accidental longituidnal movement along the outer periphery of the shaft 12.

A suitable bearing 162 is disposed around the outer periphery of the shaft 12 in spaced relation with respect to the bearing 148 for supporting a sleeve means 164 in concentrically spaced relation with respect to the shaft 12. A hub member 166 is also disposed in concentrically arranged spaced relation with respect to the shaft 12, and a plurality of spaced suitable dynamic seals 168 are interposed between the hub 166 and the outer periphery of the shaft 12 and between the sleeve 164 and the shaft 12 for precluding leakage of fluid therebetween and facilitating the free rotation of the shaft 12 with respect to the sleeve 164 and the hub 166. An annular plate means 170 is secured around the outer periphery of the shaft 12 in any suitable manner (not shown) and disposed outboard of the bearing 162 and sleeve 164 for retaining the bearing 162 and sleeve 164 against accidental longitudinal movement along the outer periphery of the shaft 12. The plate means 170 may be provided with a passageway 172 providing communication between the exterior of the plate 170 and the interior of the sleeve 164 whereby a suitable lubricant may be injected through the passageway 172 for lubrication of the bearing 162 and seals 168. Of course, suitable lubricating means may be provided for the injection of a lubricant into the proximity of the bearing 148 and seal members 154, as is well known. An outwardly extending circumferential flange 174 is provided at one end of the hub 166 and disposed against the inner end of the sleeve 164. The flange 174 may be secured to the sleeve or to the plate 170 in any suitable manner (not shown).

A sleeve or cylindrical housing 176 is concentrically arranged around the outer periphery of the ring 84 and the inner periphery of the sleeve 176 is spaced radially outwardly from the outer periphery of the ring 84. The sleeve 176 is interposed between the flanges 86 and 88, and the flanges 86, 88, 156 and 174 may be secured to the sleeve 176 in any suitable manner, such as by a plurality of circumferentially spaced bolts 178 and complementary nuts 180, as is well known. The flanges 156 and 174 cooperate with the sleeve 176 and the flanges 86 and 88 to provide an internal chamber 182 within the apparatus 82. The flange 156 is provided with an inlet port 184 for receiving a suitable fitting means 186 therein for communicating a suitable fluid, such as water, or other hydraulic fluid, into the chamber 182. The flange 174 may also be provided with an inlet port 188 for receiving a suitable fitting 190 therein whereby a suitable fluid may be introduced into the chamber 182. The sleeve 176 is provided with at least one and preferably a plurality of outlet ports 192 (FIG. 5) for receiving suitable fitting means 194 for discharging fluid from the chamber 182, as will be hereinafter set forth.

In the event the apparatus 82 is utilized in the installation shown in FIG. 1, the sleeve or housing 176 may be provided with radially extending flange means 196 (FIG. 1) for connection with a lug means 198 secured to the inner periphery of the housing 20 whereby the sleeve 176 will be held against rotation about its own longitudinal axis, thus preparing the apparatus 82 for use in a braking operation. Of course, the sleeve 176 may be suitably secured to substantially any stationary support element (not shown) or the like when the apparatus is being used as a braking apparatus in an environment other than that shown in FIGS. 1 and 2. Alternatively, the sleeve 196 may be suitably secured to the rotatable element (not shown) or the like when the apparatus 82 is to be utilized for a clutch operation wherein the rotation of the shaft 12 is to be transmitted to said rotatable element.

It has been found preferable to provide suitable bellow-type spring means 200 in the hiatus 96 between each pair of the pistons 92 and 94 for facilitating the reciprocation of the pistons in the respective bore 90. Whereas the pistons may reciprocate efficiently without the use of the spring means 200, it has been found that the overall action of the pistons may be improved by the utilization of the spring means 200.

When the apparatus 82 is to be utilized in a braking operation the sleeve 176 may be secured to any stationary support structure such as the stationary support structure of a drawworks, as hereinbefore set forth and the shaft 12 may be secured to any rotatable device such as the drum shaft 72 shown in FIG. 2. During the rotation of the shaft 12 about its own longitudinal axis the bearings 148 and 168 isolate the rotation of the shaft 12 for, the sleeve 176 and flanges 86, 88, 156 and 174. When it is desired to stop the rotation of the shaft 12, a suitable pressure fluid, such as air, hydraulic fluid, or the like, may be directed through the longituidinal passageway 136 of the shaft 12 in any well known manner for delivery to the hiatus 96 between the pistons 92 and 94. The pressure within the chamber of hiatus 96 acts against the inboard faces of the pistons 92 and 94 and overcomes the force of the spring means 200 (assuming that the spring means is utilized) for urging the pistons radially outwardly from the opposite ends of the bore 90. This moves the friction elements 142 of each piston 92 and 94 into engagement with the inboard faces of the flanges 86 and 88 and since the flanges 86 and 88 are held stationary or against rotational movement the rotation of the disc 84 will be stopped. The disc 84 is connected with the shaft 12 through the key 100 and thus rotation of the shaft 12 will be stopped simultaneously with the cessation of the rotation of the disc 84.

When the rotation of the shaft 12 is to be reinstated, the pressure fluid may be withdrawn from the chambers 96 between the corresponding sets of pistons 92 and 94 whereupon the pistons will retract to the normal positions therefor within the respective bore 90, and out of engagement with the flanges 86 and 88. When the engagement of the friction elements 142 with the flanges 86 and 88 is released, the disc 84 is free to rotate independently of the flanges and thus rotation of the disc 12 and shaft 18 may be resumed. The springs 200 may be desirable in order to release the engagement of the friction members 142 from the flanges 86 and 88 in any instance wherein the friction material of the members 142 may adhere slightly to the face of the flanges.

When the apparatus 82 is in the braking operating condition, considerable heat is generated due to the frictional engagement between the flanges 86 and 88 and the friction members 142. In order to dissapate this heat, a suitable coolant, such as water or the like, may be injected into the chamber 182 through the inlet fittings 186 and 190. The fluid circulates around the friction elements and flanges 86 and 88 and is discharged from the chamber 182 through the discharge fittings 194. The water or coolant may be returned to the original source thereof for recirculating through the chamber 182, or may be discarded, as desired.

When the apparatus 82 is to be utilized in a clutch operation, the sleeve 176 may be operably connected with a rotatable element (not shown) which is to be rotated intermittently with respect to the rotation of the shaft 12. In this instance, the pressure fluid is applied to the chambers 96 when it is desired to initiate the rotation of the intermittently rotatable element, and the application of fluid pressure to the chambers 96 as hereinbefore set forth causes the respective pistons 92 and 94 to move axially outwardly in opposite directions for bringing the friction elements 142 into engagement with the inboard faces of the annular flanges 86 and 88. With the elements 142 in frictional engagement with the flanges 86 and 88, the rotation of the disc 84 is transmitted to the sleeve 176, thus providing a clutching operation between the disc 84 and the intermittently rotatable element. Of course, relief of the pressure from the chambers 96 permits the pistons 92 and 94 to retract axially to the normal disengaged position within the respective bores 90 whereby the disc 84 is freely rotatable independently of the sleeve 176.

In the clutching operation of the apparatus 82, heat is generated in much the same manner as in the braking operation. Here again, the heat may be dissipated by injecting the coolant into the chamber 182 through the ports or fittings 186 and 190 and circulating the coolant in the chamber 182 for discharge through the outlet fittings 194.

Figure 6:
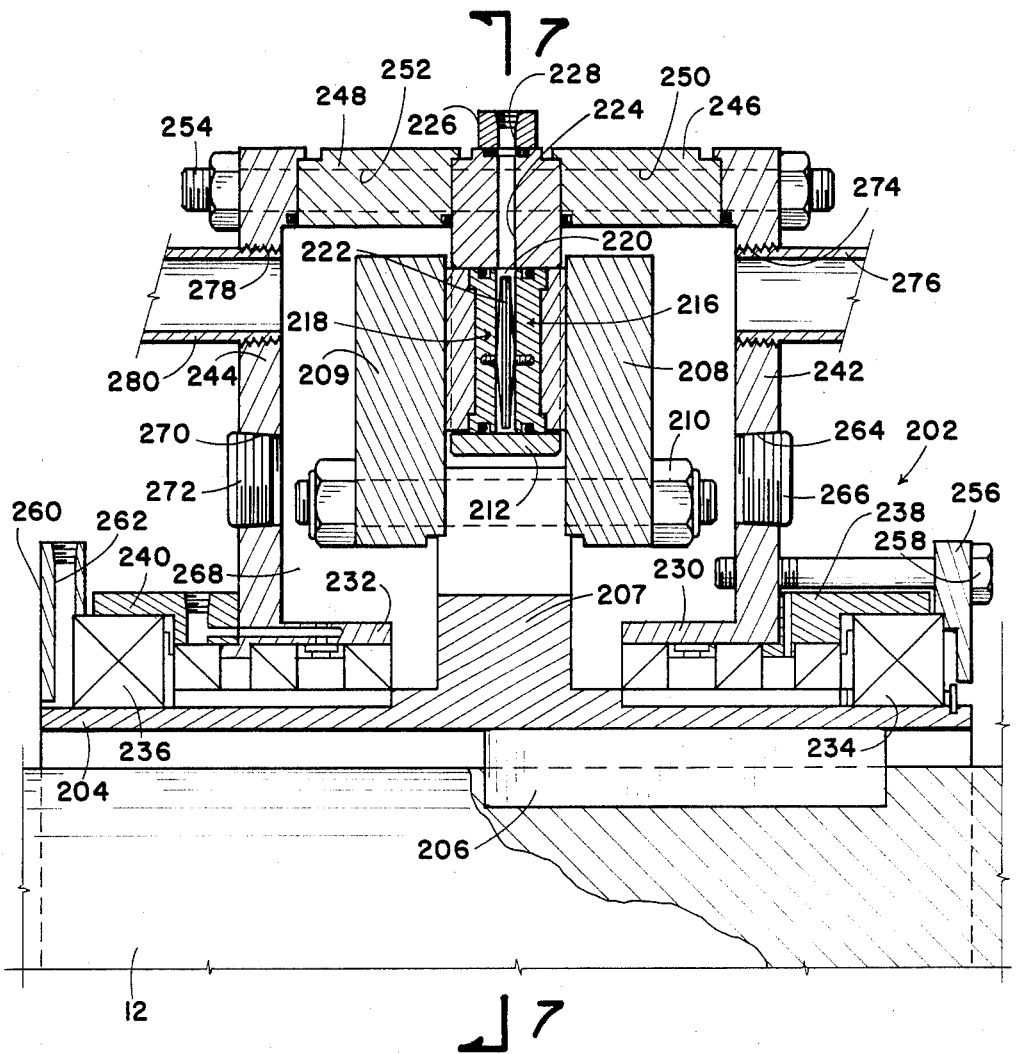
FIG. 6 is an enlarged sectional elevational view of a half section of a modified multiple biscuit brake or clutch apparatus embodying the invention and taken on line 6—6 of FIG. 7.
Figure 7:
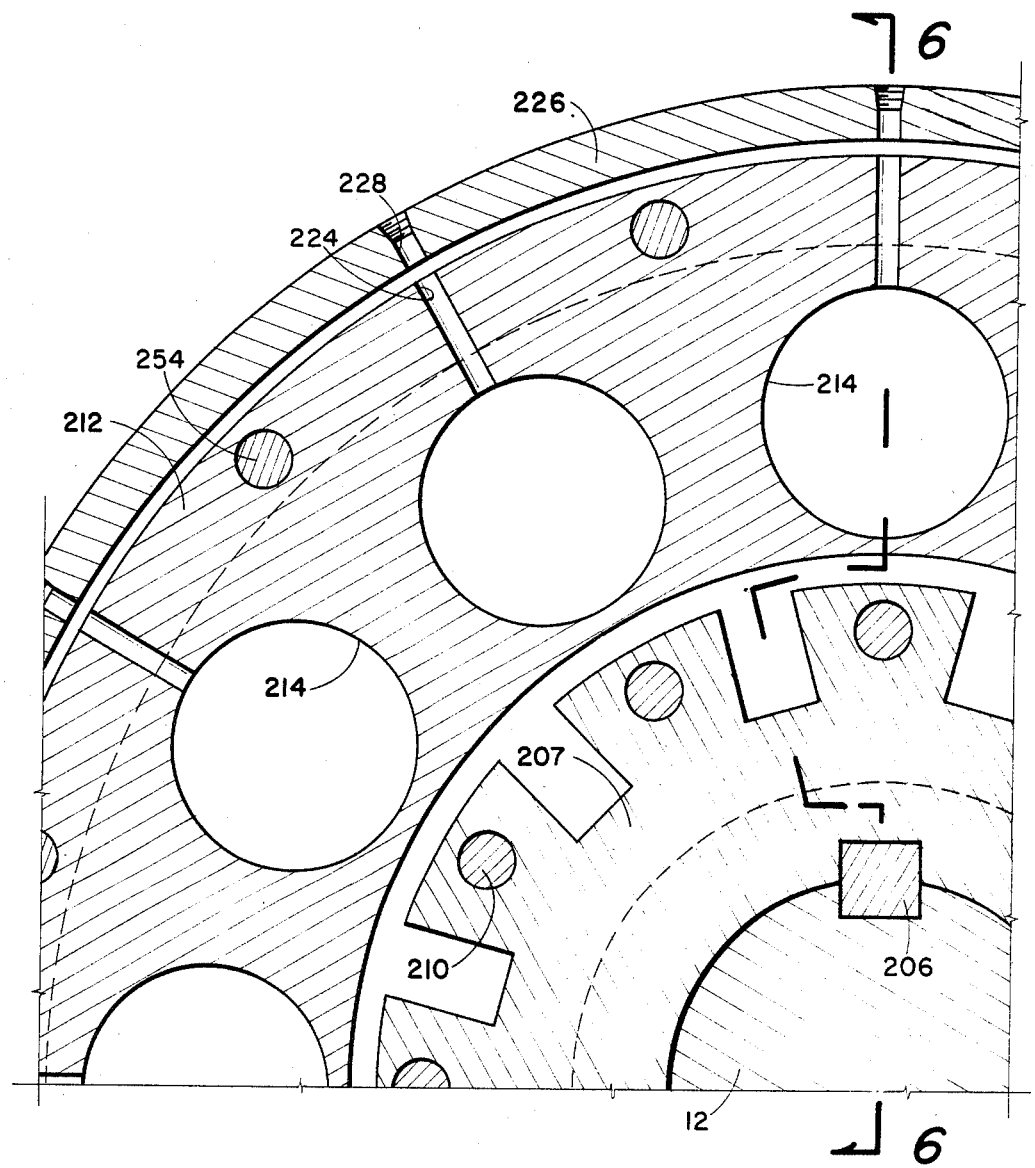
FIG. 7 is a view taken on line 7—7 of FIG. 6.

Referring now to FIGS. 6 and 7, reference numeral 202 generally indicates a multiple biscuit brake-clutch apparatus similar to the apparatus 82. The apparatus 202 comprises a hub member 204 disposed around the outer periphery of the shaft 12 and secured thereto in any suitable manner for rotation simultaneously therewith, such as by a key means 206. A substantially centrally disposed outwardly extending circumferential flange 207 is provided around the outer periphery of the hub 204 and a pair of annular flanges 208 and 209 are secured to the opposite faces thereon in any suitable manner, such as by a plurality of circumferentially spaced bolts 210. The flanges 208 and 209 are disposed on the opposite sides of an annular disc or plate 212 which is concentrically arranged around the outer periphery of the flange 207 and in radially spaced relation with respect thereto.

The disc 212 is provided with a plurality of circumferentially spaced apertures or bores 214 similar to the bores 90, and a pair of oppositely disposed or back-to-back pistons 216 and 218, substantially identical to the pistons 92 and 94 are slidably disposed in each bore 214. A chamber or hiatus 220 is provided between each pair of pistons 216 and 218, and it may be desirable to provide suitable bellows spring means 222 similar to the spring means 200 in each chamber 220 for the purpose as hereinbefore set forth. In addition, a radially outwardly extending passageway 224 is provided in the disc means 212 in communication with each of the chambers 220. An annular ring 226 is secured around the outer periphery of the disc means 212 and is provided with a plurality of bores 28 extending radially therethrough, each of the bores 228 being in communication with an associated bore 24 whereby a pressure fluid may be introduced into the chambers 220 for actuation of the pistons 216 and 218 in the manner as hereinbefore set forth.

A pair of substantially identical but oppositely disposed flanged hubs 230 and 232 are concentrically disposed around the outer periphery of the hub 204 and may be supported thereon by suitable bearings 234 and 236 similar to the bearing 148 and 162 and complementary sleeve members 238 and 240 similar to the sleeve members 150 and 164. The flanged hubs 230 and 232 are provided with outwardly extending circumferential flanges 242 and 244, respectively, disposed on the opposite sides of the annular flanges 208 and 209 and spaced outwardly therefrom. A pair of cylindrical sleeves 246 and 248 are interposed between the outer peripheries of the flanges 242 and 244 and the annular disc 212. The sleeves 246 and 248 are provided with a plurality of spaced bores 250 and 252, respectively, for receiving bolts 254 therethrough. The bolts 254 extend through the flanges 242 and 244 and the sleeves 246 and 248 for securing the flanges and sleeves together. In addition, the flange 242 may be secured to an annular locking ring 256 by suitable bolt means 258. The ring 256 bears against the bearing 234 and retains the bearing 234 and sleeve 238 in position on the hub 204.

An annular ring member 260 similar to the ring 170 may be secured at the opposite end of the hub 204 in any suitable manner, and may be provided with passageway means 262 in communication with the interior of the sleeve 240 in order that a suitable lubricant may be injected into the area surrounding the bearing 236. Suitable lubrication means may also be provided for the bearing 234. In addition, suitable dynamic sealing means 264 may be interposed between the outer periphery of the hub 204 and the hubs 230 and 232 and the sleeves 238 and 240 for precluding leakage of fluid therebetween as is well known. The flange 242 is provided with an inlet port 264 for receiving a suitable fitting means 266 therein whereby a coolant, such as water or the like, may be introduced into the chamber 268 provided between the flanges 242 and 244 and within the sleeves 246 and 248. A similar inlet port 270 is provided in the flange 244, preferable in substantial alignment with the port 264, but not limited thereto, and a suitable fitting 272 may be inserted in or installed in the port 270 for the admission of the coolant therethrough into the chamber 268. The flange 242 is provided with an outlet port 274 in radially outwardly spaced relation with respect to the inlet 264, and is provided with a suitable fitting or conduit means 276 for discharge of the coolant from the chamber 268, as will be hereinafter set forth. Similarly, the flange 244 is provided with an outlet port 278 for receiving a suitable fitting or conduit means 280 therein for discharge of the coolant from the chamber 268.

The operation of the apparatus 202 is generally similar to the operation of the apparatus 82. The pistons 216 and 218 are responsive to the application of pressure into the hiatus 220 for axially outward movement in the respective bores 214 for frictional engagement with the flanges 208 and 209 in order to provide either a braking or clutching operation. In the event the apparatus 202 is utilized in a braking installation, the ring 228 may be secured to a stationary object, such as the lug means 198 shown in FIG. 1, whereby the engagement of the pistons 216 and 218 with the flanges 208 and 209, respectively, will stop the rotation of the shaft 12 about its own longitudinal axis. In the event the apparatus 202 is to be utilized in a clutching operation, the ring means 228 may be suitable secured to a rotatable element whereby the engagement between the pistons 216 and 218 with the respective flanges 208 and 209 will transmit rotation to the shaft 12 or vice versa.

As hereinbefore set forth, the frictional engagement between the pistons 216 and 218 with the flanges 208 and 209 creates considerable heat in both the braking and clutching operations. In order to dissipate the heat, the coolant may be introduced into the chamber 268 through the inlet ports 264 and 270, whereupon the coolant may be circulated over and around the pistons 216 and 218 and flanges 208 and 209. The heated coolant may then be removed from the chamber 268 through the outlet ports 274 and 278.

From the foregoing it will be apparent that the present invention provides a novel multiple biscuit brake/clutch apparatus having an immersion cooling system for dissipation of the heat generated during either a clutching or braking operation. The novel apparatus comprises an annular disc means having a plurality or circumferentially spaced axially movable back-to-back piston members carried thereby and responsive to the application of fluid pressure therebetween for selective engagement with annular flanges disposed outboard of the pistons. The disc means is operable secured to a rotatable shaft independently of the flanges, and upon engagement of the pistons with the flanges, either a clutching or braking operation is provided. The disc and flanges are disposed in a chamber having inlet and outlet port means whereby a suitable coolant, such as water, or the like, may be injected or admitted into the chamber for circulation over and around the frictional elements in order to dissipate the heat. The warm or heated coolant is then removed from the chamber and either recirculated through the system, or discarded, as desired. The circulation of the coolant efficiently dissipates the generated heat during either the braking or clutching operation.

Whereas the present invention has been described in particular relation to the drawings attached hereto, it should be understood that other and further modifications, apart from those shown or suggested herein may be made within the spirit and scope of this invention.

What is claimed is:

1. A friction apparatus adapted for installation on a rotatable shaft and comprising hub means concentrically disposed around the shaft and secured thereto for rotation simultaneously therewith, a rotatable annular disc means concentrically disposed around the shaft and adapted for connection with the shaft for selected simultaneous rotation therebetween, a pair of annular flanges disposed outboard of the disc means and spaced slightly from the opposite sides thereof, piston means carried by the disc means and operable between extended and retracted positions between the annular flanges for alternate frictional engagement and disengagement with respect thereto, means secured to the annular flanges for supporting thereof independent of the disc means whereby the disc and annular flanges coact simultaneously in the frictional engaged position of the piston means and act independently in the disengaged position of the piston means, fluid chamber means disposed around the disc means and pistons and flanges for receiving and circulating a coolant therearound for dissipation of heat created by the frictional engagement between the piston means and annular flanges.

2. A friction apparatus as set forth in claim 1 wherein the fluid chamber means comprises housing means encasing the disc means and pistons and flanges for providing a chamber therearound, and means for introducing the coolant into and withdrawing the coolant from the chamber.

3. A friction apparatus as set forth in claim 2 wherein the last mentioned means comprises inlet means provided in the housing means and in commumication with a source of coolant whereby the coolant may be directed into the chamber for circulation around the disc means and pistons and annular flanges, and outlet port means for withdrawal of the circulated coolant from the chamber.

4. A friction apparatus as set forth in claim 3 wherein the outlet port means is in communication with the source of coolant for recirculation of the coolant to the inlet means.

5. A friction apparatus as set forth in claim 2 wherein the housing means comprises a pair of substantially identical oppositely disposed flanged hub means supported by the rotatable shaft and disposed outboard of the annular flanges and spaced therefrom, and cylindrical sleeve means secured in the proximity of the outer periphery of the flanged hub means to encasing the disc means and piston means and annular flanges to provide the chamber therearound.

6. A friction apparatus as set forth in claim 5 and including inlet port means provided in at least one of the flanged hub means and in communication with a source of coolant for admitting the coolant into the chamber for circulation therethrough, and outlet port means provided in at least one of the flanged hub means for discharge of the circulated coolant from the chamber.

7. A friction apparatus as set forth in claim 1 wherein the annular flanges are secured to the hub means for rotation simultaneously therewith, and the disc means is independently secured concentrically around the rotatable shaft for selective engagement with the annular flanges for simultaneous rotation therebetween.

8. A friction apparatus as set forth in claim 1 wherein the disc means is secured to the hub means for simultaneous rotation therewith, and the annular flanges are independently secured concentrically around the rotatable shaft for selective engagement with the disc means for simultaneous rotation therebetween.

* * * * *